US009613180B1

(12) United States Patent
Hoffmann et al.

(10) Patent No.: US 9,613,180 B1
(45) Date of Patent: Apr. 4, 2017

(54) ROBOTIC CONTROL DEVICE AND METHOD FOR MANIPULATING A HAND-HELD TOOL

(75) Inventors: Heiko Hoffmann, Simi Valley, CA (US); Behnam Salemi, San Diego, CA (US)

(73) Assignee: HRL Laboratories, LLC, Malibu, CA (US)

(*) Notice: Subject to any disclaimer, the term of this patent is extended or adjusted under 35 U.S.C. 154(b) by 546 days.

(21) Appl. No.: 13/152,224

(22) Filed: Jun. 2, 2011

(51) Int. Cl.
*G06F 19/00* (2011.01)
*G05B 19/00* (2006.01)
*B25J 9/18* (2006.01)

(52) U.S. Cl.
CPC .............. *G06F 19/00* (2013.01); *G05B 19/00* (2013.01)

(58) Field of Classification Search
CPC ........ B25J 13/08; B25J 13/081; B25J 13/082; B25J 13/083; B25J 13/084; B25J 13/085; B25J 13/086; B25J 13/087; B25J 13/088; B25J 13/089; B25J 15/08; B25J 15/083; B25J 15/086; B25J 15/10; B25J 15/103; B25J 15/106; B25J 15/12; B25J 19/02; B25J 19/021; B25J 19/022; B25J 19/023; B25J 19/025; B25J 19/026; B25J 19/027; B25J 19/028; B25J 19/04; B25J 9/0096; B25J 9/1664; B44B 3/009; G01L 5/226; G01L 5/228; G05B 2219/40083; G06F 3/016; G06K 9/00201; G06K 9/00208; G06K 9/00214; G06K 9/00375; G06K 9/00382; G06K 9/00389; G06K 9/222; G06K 9/224;
(Continued)

(56) References Cited

U.S. PATENT DOCUMENTS 4,987,356 A * 1/1991 Yamada ................. B25J 9/1684
318/571
7,995,096 B1 * 8/2011 Cressy .............. G08B 13/19691
348/143
(Continued)

OTHER PUBLICATIONS

Tipping, M. E. and Bishop, C. M., "mixtures of Probabilistic Principal Component Analyzers," Neural Computation, 11, 443-482, 1999.
(Continued)

*Primary Examiner* — Muhammad Shafi
(74) *Attorney, Agent, or Firm* — Tope-McKay & Assoicates

(57) ABSTRACT

Described is a robotic control device for manipulating a gripper-held tool. The device includes a robotic gripper having a plurality of tactile sensors. Each sensor generates tactile sensory data upon grasping an tool based on the interface between the tool and the corresponding tactile sensor. In operation, the device causes the gripper to grasp a tool and move the tool into contact with a surface. A control command is used to cause the gripper to perform a pseudo-random movement with the tool against the surface to generate tactile sensory data. A dimensionality reduction is performed on the tactile sensory data to generate a low-dimensional representation of the tactile sensory data, which is then associated with the control command to generate a sensory-motor mapping. A series of control commands can then be generated in a closed-loop based on the sensory-motor mapping to manipulate the tool against the surface.

19 Claims, 9 Drawing Sheets

(58) Field of Classification Search
CPC .... G06K 9/6228; G06K 9/6232; G06N 3/008; Y10S 700/90
USPC .... 700/250, 259, 260, 262, 258; 901/33, 46; 701/59, 44, 46, 57, 58
See application file for complete search history.

(56) References Cited

U.S. PATENT DOCUMENTS

| | | | |
|---|---|---|---|
| 8,380,349 B1* | 2/2013 | Hickman | G05D 1/0246 700/247 |
| 9,002,098 B1* | 4/2015 | Chelian | G06T 7/0044 382/153 |
| 2003/0179922 A1* | 9/2003 | Peters | G06T 7/0018 382/153 |
| 2010/0139418 A1* | 6/2010 | Loeb | G01L 5/228 73/862.046 |

OTHER PUBLICATIONS

Heiko Hoffmann, Wolfram Schenck, Ralf Möller, "Learning visuomotor transformations for gaze-control and grasping," Biological Cybernetics, vol. 93, pp. 119-130, 2005.
Helko Hoffmann, "Unsupervised Learning of Visuomotor Associations," MPI Series in Biological Cybernetics, vol. 11, Logos Verlag Berlin, 2005, ISBN 3-8325-0858-9.
Heiko Hoffmann, Wolfram Schenck, and Ralf Möller. "Learning visuomotor transformations for gaze-control and grasping," Biological Cybernetics, vol. 93, pp. 119-130, 2005.
Wikipedia, "Sensory-Motor Map",https://en.wikipedia.org/w/index.php?title=Sensory-motor_map&oldid=553276618, taken on Sep. 15, 2016.
Montesano, L., Lopes, M., Bernardino, A., and Santos-Victor, J. (2008). "Learning Object Affordances: From Sensory-Motor Coordination to Imitation", Robotics, IEEE Transactions on, 24(1), 15-26.
Stefan Schaal, Chris Alkeson and Sethu Vijayakumar, "Real time robot learning with locally weighted statistical learning," IEEE International Conference on Robotics and Automation, San Francisco, California, vol. 1, pp. 288-293.
Jordan, M. I. and Rumelhart, D. E., "Forward models: Supervised learning with a distal teacher," Cognitive Science, 16, 307-354, 1992.
Kemp, C.C. and Edsinger, A., "Robot manipulation of human tools: Autonomous detection and control of task relevant features," 5th IEEE International Conference on Development and Learning, 2006.
Heiko Hoffmann, Georgios Petkos, Sebastian Bitzer, and Sethu Vijayakumar, "Sensor-assisted adaptive motor control under continuously varying context," Proc. International Conference on Informatics in Control, Automation, and Robotics, 2007.
Heiko Hoffmann, "Unsupervised Learning of Visuomotor Associations." MPI Series in Biological Cybernetics, vol. 11, Logos Verlag Berlin, 2005.
Heiko Hoffmann, "Perception through Visuomotor Anticipation in a Mobile Robot," Neural Networks, vol. 20, pp. 22-33, 2007.
Bruno Siciliano and Oussama Khatib (Eds.), "Handbook of Robotics," Springer, 2008.
D Nguyen-Tuong, M Seeger, and Jan Peters, "Model Learning with Local Gaussian Process Regression," Advanced Robotics 23(15) 2015-2034, 2009.
D Braganza, W.E. Dixon, D.M. Dawson, B. Xian, "Tracking Control for Robot Manipulators with Kinematic and Dynamics Uncertainty," International Journal of Robotics and Automation, vol. 23 Issue 2, Mar. 2008.
K. I. Diamantaras and S. Y. Kung, "Principal Component Neural Networks," Hoboken, NJ: Wiley, 1996.
Trevor Hastie, Robert Tibshirani, and Jerome Friedman, "The Elements of Statistical Learning: Data Mining, Interference, and Prediction," Second Edition (Springer Series in Statistics). Springer, 2009.
Heiko Hoffmann, Stefan Schaal, and Sethu Vijayakumar, "Local dimensionality reduction for non-parametric regression," Neural Processing Letters, vol. 29, pp. 109-131, 2009.
Saegusa, Ryo; Metta, Giorgio; Sandini, Giullo; Sakka, Sophie;, "Active motor babbling for sensorimotor learning," Robotics and Biomimetics, 2008. ROBIO 2008, IEEE International Conference on , pp. 794-799, Feb. 22-25, 2009.
Kuperstein, M., "Neural model of adaptive hand-eye coordination for single postures," Science, 239, 1308-1311, 1988.
Kuperstein, M., "Infant neural controller for adaptive sensory-motor coordination," Neural Networks, 4, 131-145, 1990.
Kean S., "Making smarter, savvier robots," Science. Jul. 30, 2010;329(5991):508-9.
Ariel Bleicher, "The Gulf Spill's Lessons for Robotics," IEEE Spectrum News, Aug. 2010.

* cited by examiner

ROBOTIC CONTROL DEVICE AND METHOD FOR MANIPULATING A HAND-HELD TOOL

FIELD OF INVENTION

The present invention relates to a robotic control device and, more particularly, to a system and method for robotic manipulation of a hand-held tool.

BACKGROUND OF INVENTION

The present invention is related to robotic manipulation of an item to substantially improve the dexterity of robotic manipulation in light of uncertainty. Uncertainty is present in the hand-tool interface: currently, it is still close to impossible for a robotic hand to grasp objects at predetermined contact points and forces. Moreover, uncertainty is present in the tool-environment interface (e.g., between a pen tip and paper) as friction is still hard to model and to predict. Prior methods that analytically model a grasp failed under such uncertainty.

Previous efforts in the area of robotic manipulation under uncertainty focused on using low-gain compliant control. Such control avoids hard collisions, but cannot provide precision control if required (e.g., for writing). To improve precision, some efforts used learning methods to compute control torques without increasing the control gains for trajectory tracking. Through random exploration (motor babbling), the robot learns the kinematic and dynamic relationship between joint angles or torques and hand position. These efforts were limited to learning the kinematics and dynamics of the robot arm itself and thus could not cope with an uncertain interface between robot gripper (e.g., hand) and manipulated object.

Recent prior art has dealt with the uncertain interface between the gripper and object. For example, researchers Kemp and Edsinger found a method to obtain the position of a tool tip without knowing the contact point between tool and gripper. They described their process at "Robot manipulation of human tools: Autonomous detection and control of task relevant features," 5th IEEE International Conference on Development and Learning, 2006. As described by Kemp and Edsinger, the robot determines the tip position by waving the gripper and computing the image location of highest speed. While operable for determining the tip position, the method is limited to certain tool shapes and requires visual feedback via a visual sensor (e.g., video camera).

As opposed to visual sensor, tactile sensors sense a contact sensation. However, existing tactile sensors are still very noisy and have not been previously used to analyze the uncertain interface between the gripper and tool. So far, the utility of tactile sense in robots is largely reduced to on/off switches. In contrast, humans greatly enhance their manual dexterity through tactile sense. Blind people demonstrate that great dexterity is possible using only tactile feedback. In addition, fine motor skills in healthy humans are hampered if tactile sense is removed (e.g., lighting a match with anaesthetized fingers is almost impossible). Thus, if tactile feedback can be efficiently exploited, robotic manipulation will become more feasible in human-like settings.

In summary, over the last several decades, many research groups around the world have worked on robotic manipulation, but the uncertainty of a grasp has prohibited dexterous tool use. Tactile sense has not been used efficiently for manipulation. The robotic field focused either on predicting sensory input analytically or triggering purely reactive behavior given sensory input. The first is limited by the noise of the sensory input, and the second prohibits gradual change of force application.

Thus, a continuing need exists to extend robotic control into the tactile domain by allowing a more gradual change of force application that smoothly adapts to changes in the environment (e.g., surface slope for writing).

SUMMARY OF INVENTION

The present invention relates to a system and method for robotic manipulation of a hand-held tool. For example, the present invention includes a robotic control device for manipulating such a hand-held tool. The device includes a gripper (e.g., robotic hand) that is mobile in at least one degree-of-freedom. A plurality of tactile sensors is attached with the gripper. Each sensor is operable for generating tactile sensory data upon grasping a tool based on the interface between the tool and the corresponding tactile sensor. Examples of such tactile sensory data include a magnitude and direction of a force input. To control the gripper and manage the tactile sensory data, a computer is communicatively connected with both the gripper and the tactile sensors. The computer includes both a memory and a data processor. The memory is specifically encoded with instructions, that when executed, cause the data processor to perform the operations listed herein.

In operation, the device causes the gripper to grasp a tool and move the tool into contact with a surface. A control command is used to cause the gripper to perform a movement (e.g., sinusoidal curve, pseudo-random movement, etc.) with the tool against the surface to generate tactile sensory data. A dimensionality reduction is performed on the tactile sensory data to generate a low-dimensional representation of the tactile sensory data, which is then associated with the control command to generate a sensory-motor mapping. A series of control commands can then be generated in a closed-loop based on the sensory-motor mapping to manipulate the tool against the surface.

In another aspect, the present invention includes an image sensor for capturing an image of the tool. In this aspect, the computer is further configured to cause the processor to perform operations of capturing an image of the tool; identifying a desired point on the tool for moving into contact with the surface; and generating a series of control commands in a closed-loop to cause the gripper to manipulate the tool until the desired point is moved into contact with the surface.

Finally, the present invention also includes a computer program product and computer implemented method. The computer program product includes computer-readable instructions stored on a non-transitory computer-readable medium that are executable by a computer having a processor for causing the processor to perform the listed operations. Alternatively, the method comprises an act of causing a computer having a processor to execute instructions specifically encoded on a memory, such that upon execution, the processor performs the operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
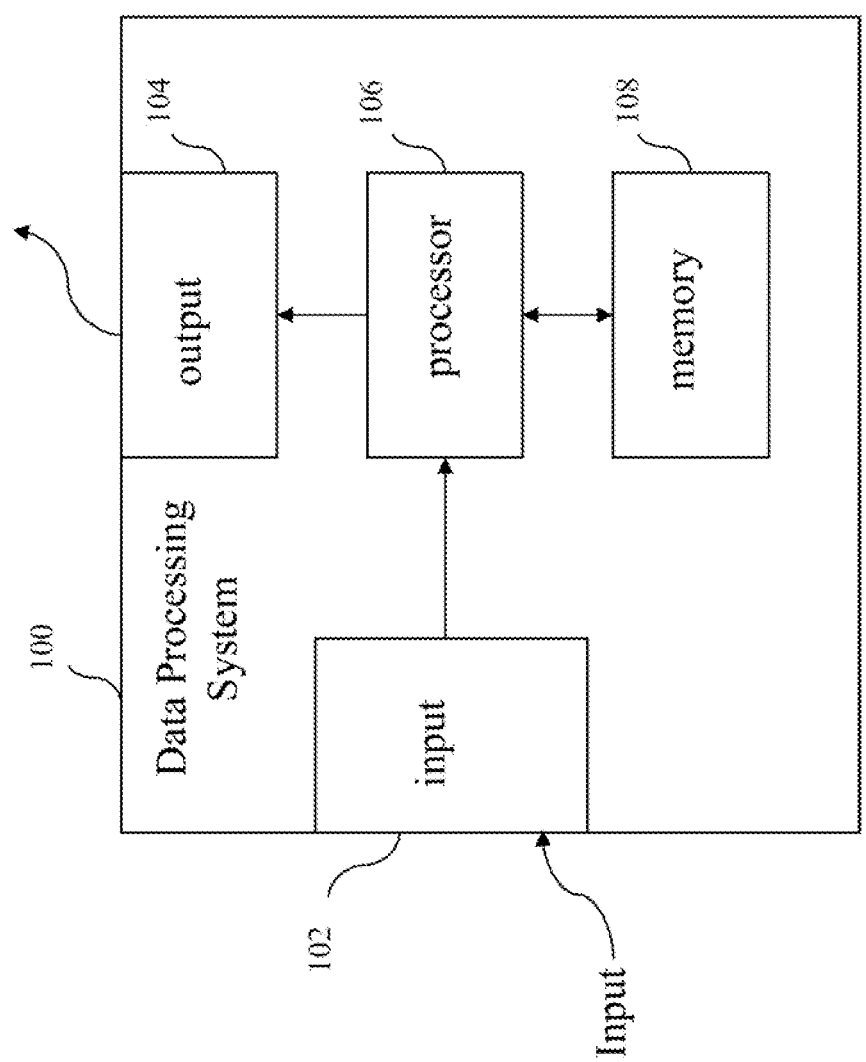
FIG. 1 is a block diagram depicting the components of a robotic control system of the present invention.

The present invention relates to a robotic control device and, more particularly, to a system and method for robotic manipulation of a gripper-held tool. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification. (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112. Paragraph 6. In particular, the use of "step of" or "act of" in the claims herein is not intended to invoke the provisions of 35 U.S.C. 112, Paragraph 6.

Before describing the invention in detail, first a description of various principal aspects of the embodiments of the present invention is provided. Subsequently, an introduction provides the reader with a general understanding of the principles of the present invention. Next, details of the embodiments of the principles of the present invention are provided to give an understanding of the specific aspects. Finally, a brief synopsis is provided of the present invention.

(1) Principal Aspects

The present invention has several embodiments and may include additional embodiments than those described herein. The first is a robotic control system. The robotic control system is typically in the form of a computer system operating software or in the form of a "hard-coded" instruction set. This system may be incorporated into a wide variety of devices that provide different functionalities, including the hardware of the robotic gripper (or hand) and the corresponding tactile sensors. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. The term "instructions" generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. These aspects will be described in more detail below.

A block diagram depicting the components of a robotic control system of the present invention is provided in FIG. 1. The system 100 comprises an input 102 for receiving information from at least one sensor (e.g., tactile sensor) for use in detecting a surface or an applicable part of the hand-held tool. Note that the input 102 may include multiple "ports." Typically, input is received from at least one sensor, non-limiting examples of which include tactile sensors and video image sensors. An output 104 is connected with the processor for providing information regarding the surface and/or presence and/or identity of hand-held tool(s) in the scene to other systems in order that a network of computer systems may serve as a robotic control system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
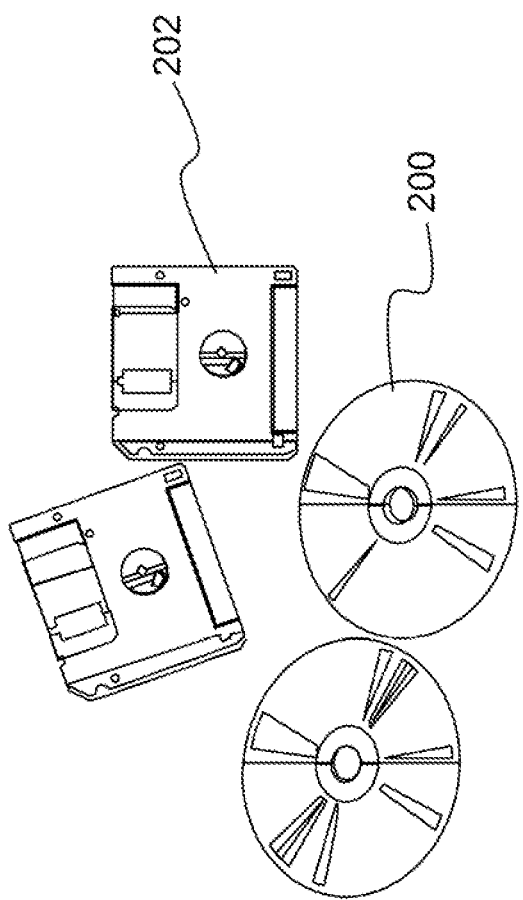
FIG. 2 is an illustration of a computer program product embodying the present invention.

An illustrative diagram of a computer program product embodying the present invention is depicted in FIG. 2. The computer program product is depicted as an optical disk 200 such as a CD or DVD, or as a floppy disk 202. However, as mentioned previously, the computer program product generally represents computer-readable instructions stored on any compatible computer-readable medium.

(2) Introduction

Robotic manufacturing in cooperation with humans and robotic assistance in a human environment require the handling of tools that a robot grasps in an imprecise way. The present invention provides a system to manipulate a tool within a robot gripper without detailed knowledge of the gripper-tool interface. The robot gripper is equipped with tactile sensors, which feed information to a computer that controls the gripper. In particular, the present invention allows applying a controlled pressure with the tip of the tool (e.g., a pen) on a surface despite uncertainty about how the tool is held in the gripper and uncertainty about the structure of the surface. A unique aspect of this invention is a process that (a) learns a mapping between tactile feedback and tool control through random exploration and dimensionality reduction and (b) uses this mapping to control the robot gripper.

(3) Details of the Invention

A purpose of this invention is a process for controlled force application with a tool in a robotic gripper. The invention addresses the difficulty to hold a tool exactly in a pre-computed posture. Thus, this posture will be uncertain. To control the tool despite this uncertainty, the robot explores the tactile feedback resulting from its actions and learns an association between the two.

Figure 3:
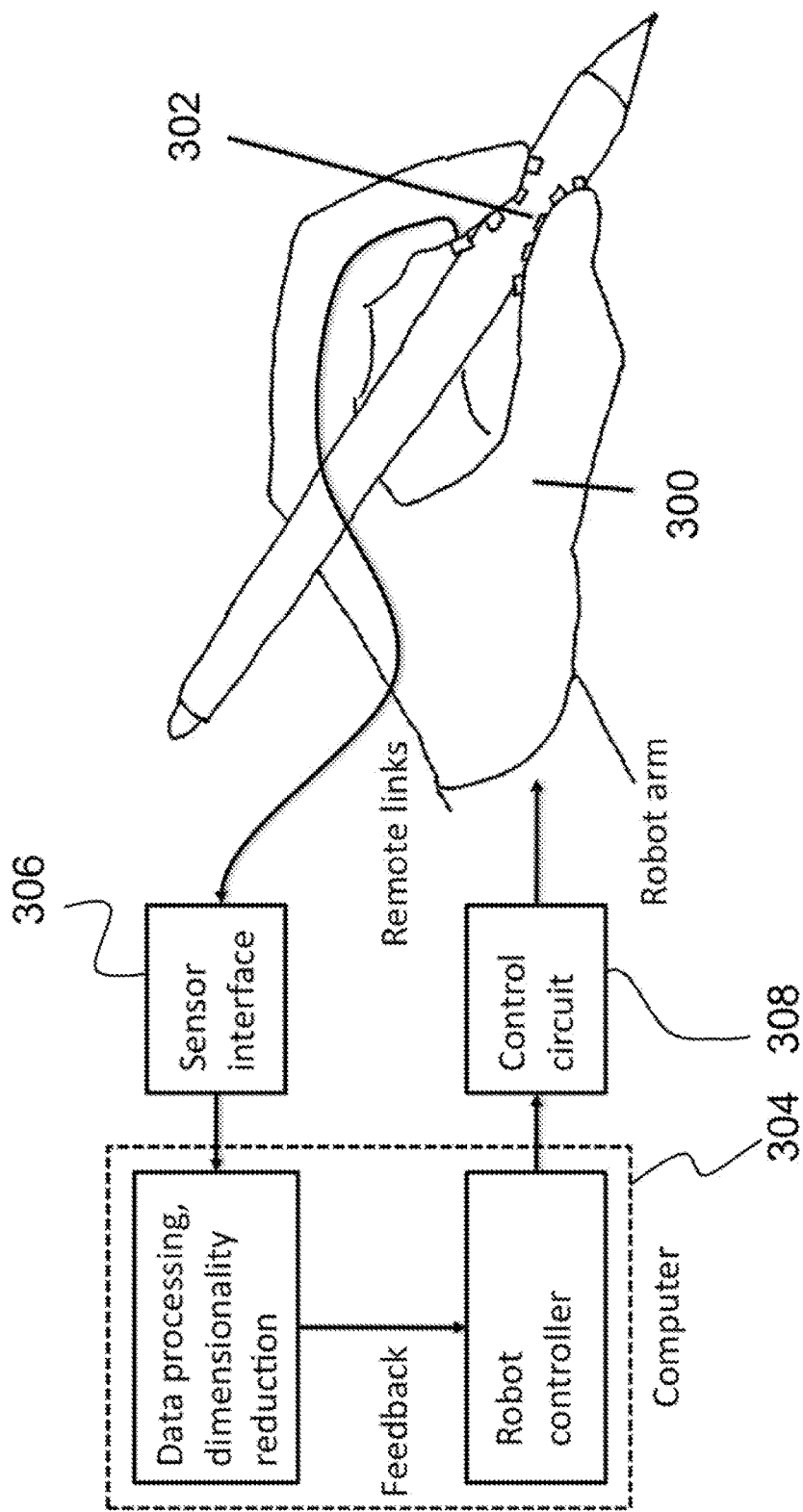
FIG. 3 is an illustration of a gripper (i.e., robotic hand) with tactile sensors and corresponding tool to be grasped.
Figure 4B:
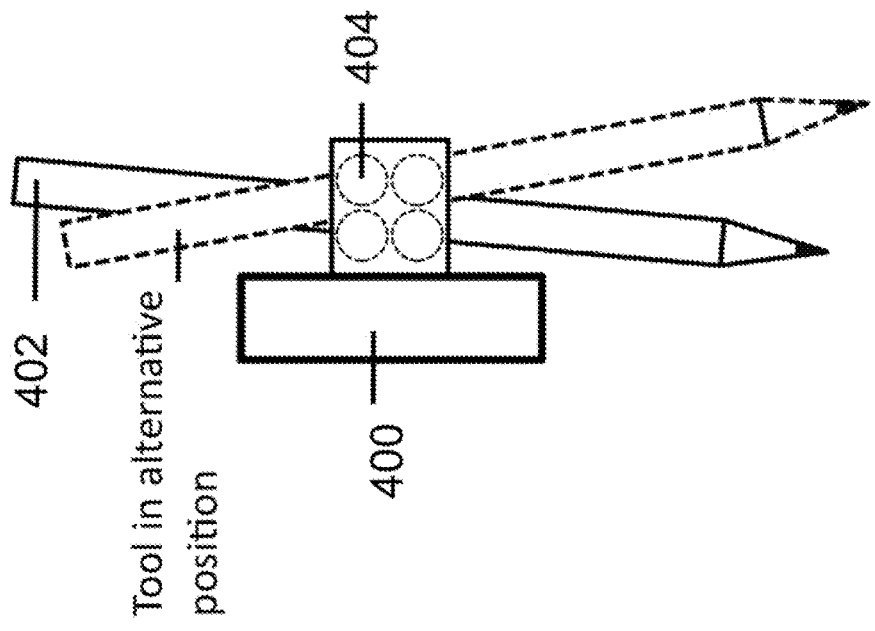
FIG. 4B is a side-view illustration of the gripper and grasped tool.
Figure 4A:
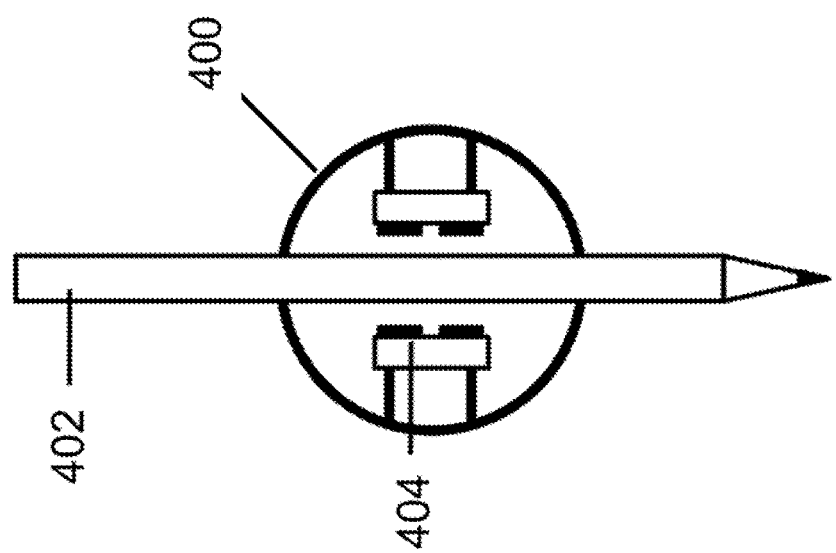
FIG. 4A is a front-view illustration of the gripper and grasped tool.

Elements of the present invention are depicted in FIG. 3. As shown, the present invention can be embodied as an apparatus that includes a robotic arm and gripper 300. It should be understood that the robotic gripper 300 operates as a gripper to grasp a hand-held tool (i.e., object). Thus, in its most simple aspect, the robot gripper 300 can be referred to interchangeably as a gripper that is mobile in at least one degree of freedom. For example and as depicted in FIGS. 4A and 4B, a simple gripper 400 is used to grasp a tool 402 (e.g., pencil). However and referring again to FIG. 3, the robotic gripper 300 is not limited to a simple gripper (as depicted in FIGS. 4A and 4B), but can also be a more complicated, multi-directionally mobile robotic hand (as depicted in FIG. 3) that is mobile in many degrees-of-freedom.

To allow the robotic gripper 300 to sense contact with the tool, a plurality of tactile sensors 302 are positioned on or otherwise attached with the robotic gripper 300. The tactile sensor 302 is any suitable sensor that is capable of generating tactile sensory data upon grasping a tool (e.g., sensing touch, force, or pressure) and that can be employed at an interface between the robotic gripper 300 (via the corresponding tactile sensor) and the tool. A non-limiting example of a suitable sensor is the Shadow Tactile Sensor as produced by the Shadow Robot Company. Ltd., 251 Liverpool Road, London, NI ILX, United Kingdomn. The tactile sensors 302 can be positioned at any suitable location about the gripper 300. As a non-limiting example, the gripper 300 includes robot fingers, with the tactile sensors 302 positioned on the robot fingers.

The invention also includes a computer 304 to process sensory data (through a sensory interface 306) and to control the robot. For this control, the computer 304 may be linked to an external micro-controller (control circuit 308) that provides the control commands to the robotic hardware, e.g., torques at the arm joints, etc. In addition, an external circuit (sensory interface 306) may interface with the tactile sensors 302. The robot gripper 300 and computer 304 are linked through wires or a wireless connection.

As can be appreciated by one skilled in the an, this specification is not directed to low-level robot control, as such controllers are commonly available. Instead, the present invention is directed to a system that is able to learn to manipulate a hand-held tool using the robot gripper 300. As noted above, a problem with manipulating a hand-held tool is the uncertainty between the hand-tool interface. To control the tool despite this uncertainty, the principles of the invention teaches use of the tactile feedback resulting from the robot's actions and learns an association between the two.

Figure 5:
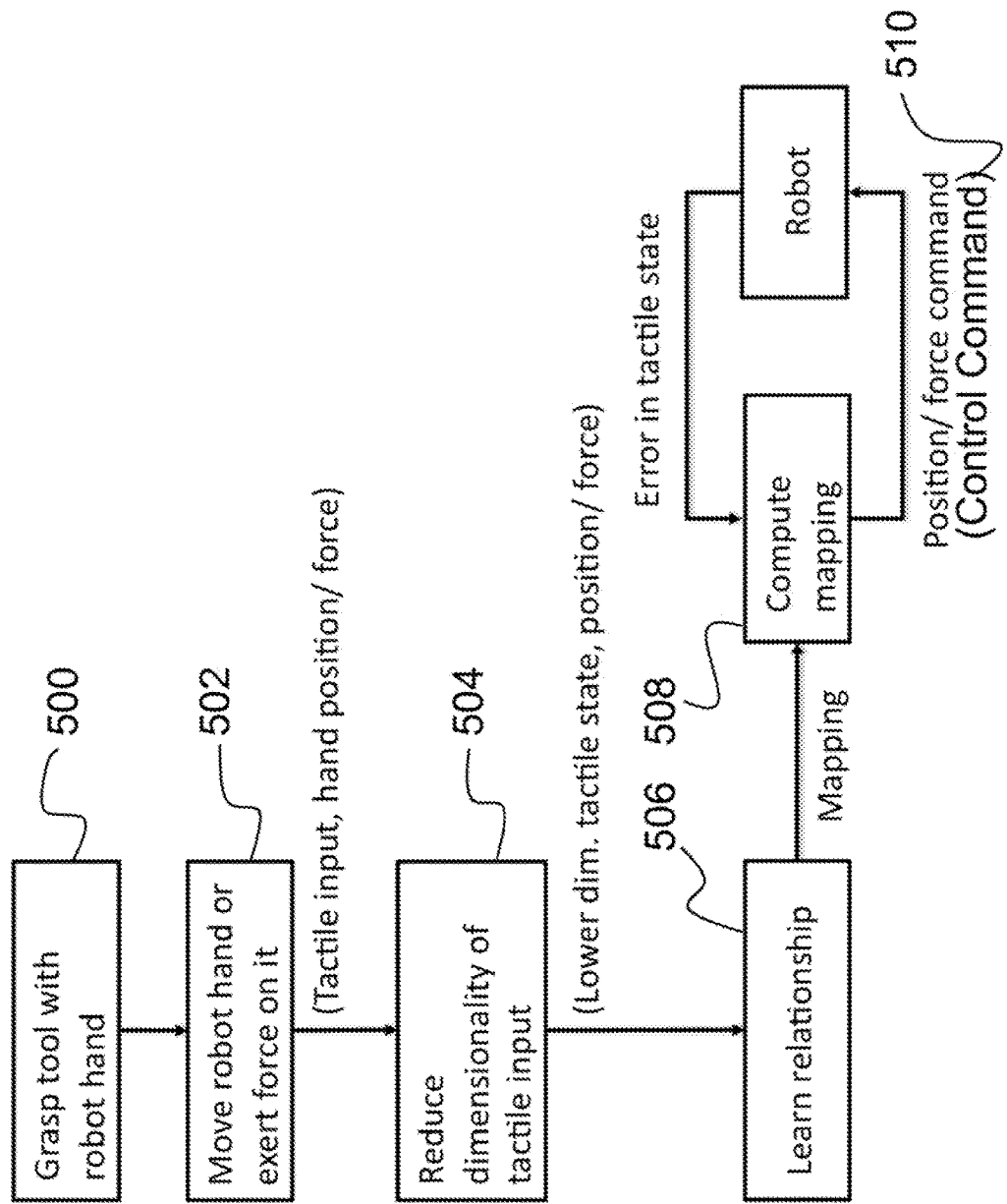
FIG. 5 is a process now diagram, depicting flow from moving the robotic gripper for exploration to learning a sensory-motor relationship, which is then used in a closed loop to control the gripper.

Initially and as depicted in FIG. 5, the system must be engaged to cause the gripper (robot) to grasp 500 a tool and move the tool into contact with a surface. The tool is also in contact with the robot gripper's tactile sensors. Though, it does not need to be in contact with all sensors. From this initial condition, the invention proceeds as follows. A control command is generated to cause the robot arm (or gripper) to perform a movement 502 with the robot gripper move the tool into contact with the surface and generate tactile sensory data. The movement 502 is any motion that brings the tool sufficiently often in contact with the surface, non-limiting examples of such movements include random movements, zig-zag movements, rectangular oscillation, periodic movements (e.g., sinusoidal curve), and pseudo-random movements. The motion must be "sufficient" to generate enough tactile sensory data to perform a dimensionality reduction 504.

Alternatively, instead of a movement, the computer may control exertion of a force at the gripper. In either event, tactile sensory data is generated at the interface between the gripper and the tool. The tactile sensory data is any suitable data that is indicative of the tactile response between the tool and the gripper, non-limiting examples of which include a magnitude of a force input and a direction of a force input. The computer stores the tactile sensory data during this movement or force application.

Figure 6:
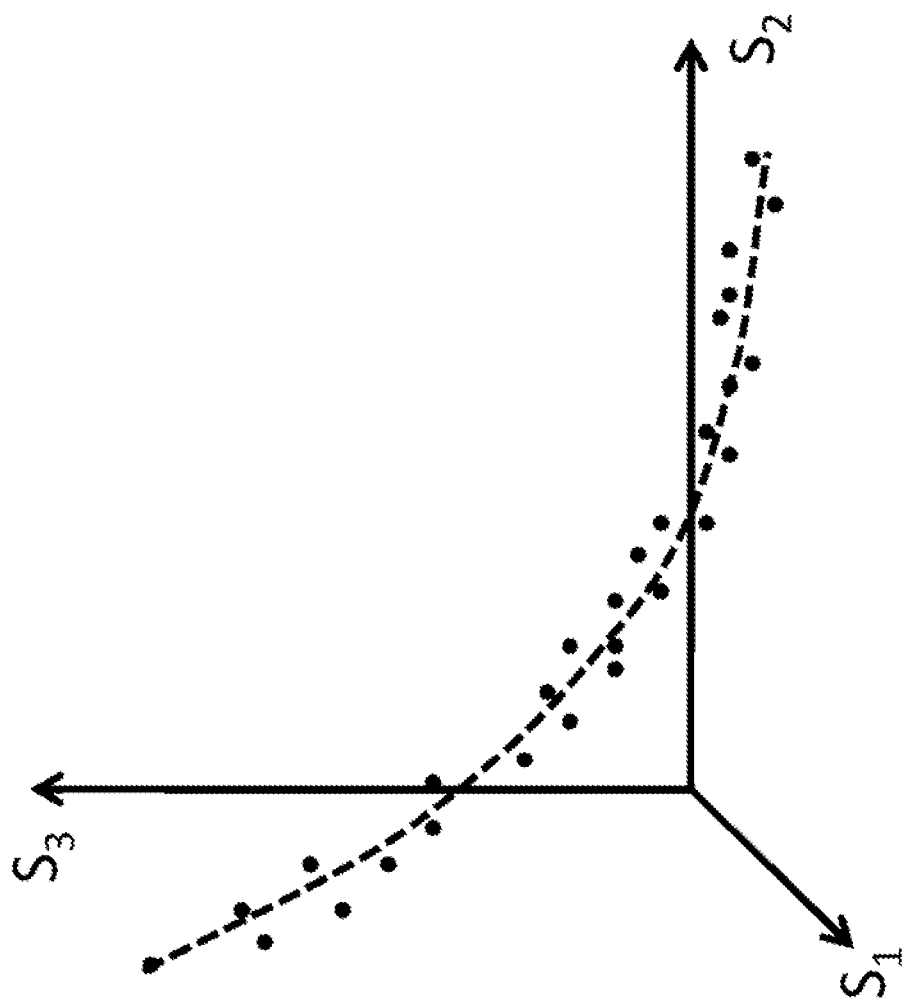
FIG. 6 is a graph depicting a distribution of sensory input data during exploration.

Thereafter and as alluded to above, the system performs a dimensionality reduction 504 of the tactile sensory data to generate a low-dimensional representation of the tactile sensory data. Thus, the computer finds a low-dimensional representation of the sensory data. As can be appreciated by one skilled in the art, there are several suitable techniques for generating a low-dimensional representation of the tactile sensory data, a non-limiting example of which includes, for a linear distribution, principal component analysis to find the direction of a maximum variance and then projection of the data onto the principal component. This technique was described by K. I. Diamantaras and S. Y. Kung, in "Principal Component Neural Networks," Hoboken, N.J.; Wiley, 1996. Through the dimensionality reduction step, a lower-dimensional representation is obtained for the sensory state. The dimensionality reduction eliminates the dependence of this state on the grasp posture of the robot. An example is depicted in FIG. 6, which is a graph depicting a distribution of sensory input during exploration. The sensory values (si) vary systematically depending on the motor command; i.e., they lie on a lower dimensional manifold (dashed curve). In this non-limiting example, only three sensory dimensions are shown for illustrative purposes. Note that a "manifold" is understood by those skilled in the art and as defined by Wikipedia as "a topological space that resembles Euclidean space near each point" (See Wikipedia.org, "Manifold"). Thus, a lower-dimensional manifold is a space embedded in a higher dimensional space. In the field of machine learning, "lower-dimensional manifold" refers to the phenomenon that data are usually high dimensional, but locally constrained to fewer dimensions, and thus the data's distribution could be described by a lower-dimensional manifold.

Figure 7:
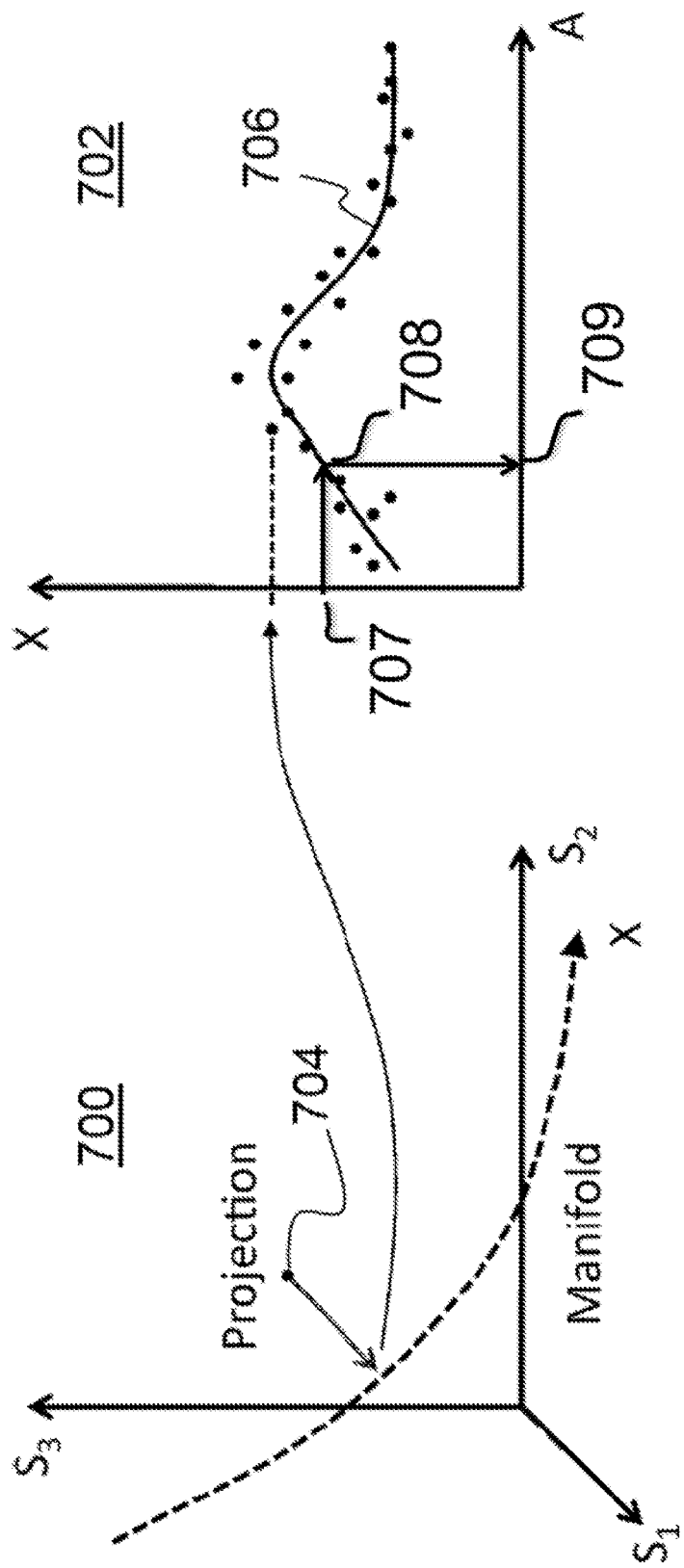
FIG. 7 is an image of two graphs that illustrate how a low-dimensional representation of sensory data is plotted against a corresponding robot action.

Next, the system learns a relationship (506) between the low-dimensional representation of the tactile sensory data and the control command for the robot arm gripper. This learning involves first collecting corresponding pairs of sensory data 704 and control commands. The right graph in FIG. 7 (702) shows data points in the joined space of sensory data (X) and control commands (A). Second, learning requires finding a manifold 706 embedded in this joined space that represents these data points. A non-limiting example to compute such a manifold is a Mixtures of Probabilistic Principal Component Analyzers (Tipping. M. E. and Bishop. C. M., *Neural Computation,* 11, 443-482, 1999). Given this manifold 706, a motor command is computed from a given sensory input as follows. Points 708 on the manifold are identified that have a sensory component that matches the given sensory input 707. One of these Points is selected and its control-command component 709 is evaluated. A non-limiting example to compute such points on the manifold and select one of them is described in (Heiko Hoffmann. Wolfram Schenck. Ralf Möller. Biological Cybernetics. Vol. 93, pp. 119-130, 2005). The component 709 is the desired control command (depicted as element 510 in FIG. 5).

Based on the learned relationship (i.e., the sensory-motor mapping) between the tactile sensory data (sensory state) and the control command, the computer converts a sensory feedback signal into control commands 510 to achieve a desired task. In other words, the system can then generate a series of control commands 510 in a closed-loop based on the sensory-motor mapping to manipulate the tool against the surface, e.g., to keep the tool in contact with the surface at constant force.

In the actual control task, only the series of control commands 510 are needed. The previous operations are carried out in preparation after firmly holding the tool. Whenever, the tool moves in the robot gripper, the preparatory steps (i.e., 500, 502, 504, and 506) need to be repeated before using series of control commands 510 again.

An aspect of this process is to autonomously learn the sensory effect of a robotic action and to learn the link between a lower-dimensional representation of the tactile input and the corresponding control commands. The control commands result in tactile input that varies predominantly in the relevant dimensions for control. Thus, dimensionality reduction extracts the relevant information for control.

As can be appreciated by one skilled in the art, the present invention is not limited to tool manipulation but can be extended to other tasks, non-limiting examples of which include inserting a key and sliding objects. Further, the online tactile-exploration strategy of the present invention can be applied to higher-dimensional motor commends (e.g., two-dimensional instead of one-dimensional).

Figure 8:
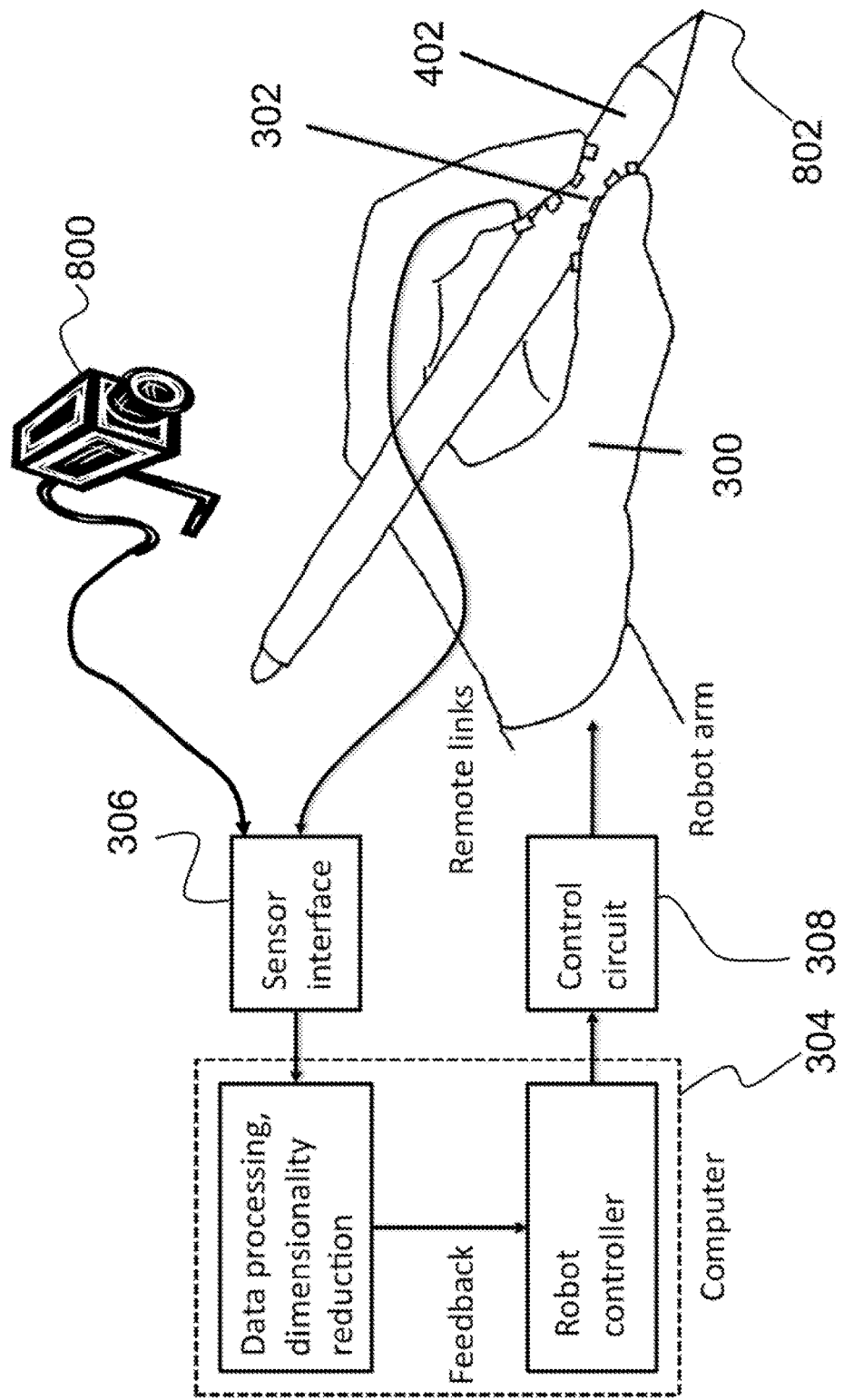
FIG. 8 is an illustration of a gripper (i.e., robotic hand) with an image sensor and a corresponding tool to be grasped.

Moreover, the concept of learning online can be extended to the uncertain interface between the robot gripper and tool without learning the full robot kinematics and dynamics. For example, other control and sensor values, such as force control and image features of the tool, can be implemented. As a non-limiting example and as depicted in FIG. 8, an image sensor 800 (e.g., camera) can be included for capturing an image of the tool 402 as connected with the robotic gripper 300. In this example, although the tactile sensors 302 are optional, they can be used to further enhance the control commands in the feedback loop. The image sensor 800 is used to capture an image of the tool 402, which is then used to identify a desired point 802 on the tool 402 for moving the point 802 into contact with a surface. In order to identify the desired point 802, the image is sent to the computer 304 (through the sensor interface 306) which includes a tool recognition/feature extraction module. The tool recognition/feature extraction module uses any suitable technique that is operable for identifying an object and/or extracting object features to identify a desired portion of the tool. A non-limiting example of such a suitable technique are so-called SUFT features, as described by Herbert Bay, Andreas Ess, Tinne Tuytelaars, and Luc Van Gool, in "SURF: Speeded Up Robust Features", Computer Vision and Image Understanding (CVIU), Vol. 110, No. 3, pp. 346-359, 2008.

The feature extraction module is operable for identifying the tool 402 and its various features to isolate the desired point 802 (e.g., tool tip). Thereafter, the computer 304 generates a series of control commands (which are passed through the control circuit 308) to cause the robotic gripper 300 to manipulate the tool 402, in a closed-loop, until the desired point 802 is positioned against the surface.

To confirm the functionality and advantages of the present invention, it was tested using a simple robotic gripper as depicted in FIGS. 4A and 4B. FIG. 4A is a front-view illustration of the gripper 400 and tool 402 (i.e., pencil), while FIG. 4B is a side-view illustration of the gripper 400 and tool 402. The test demonstrated robotic writing with a pencil on a surface with an unknown slope (i.e., not known to the robotic system). A R17 robot arm (from ST Robotics, located 103 Carnegie Center, Suite 300, Princeton, N.J. 08540) was equipped with a plurality of tactile sensors, comprising two 2×2 tactile sensor 404 arrays (from Interlink Electronics, located at 546 Flynn Road, Camarillo, Calif., 93012) at the gripper 400.

One tactile sensor array was placed on each gripper 400 finger. A pencil was placed arbitrarily between the tactile sensors 404. Thus, it was not known a priori which sensors would be in contact with the tool 402. Prior to drawing, the robot explored online the relationship between tactile response and gripper movements. On a sinusoidal curve, the gripper 400 moved up and down touching the surface with the pencil. The gripper 400 moved for three periods. All eight sensor values at 60 time steps (uniformly distributed along the three periods) were collected. On the resulting tactile sensory data, a principal components analysis was computed and the direction of maximal variance (first principal component) was extracted. Then, all sensory values were projected onto this component. The resulting relationship between the projected sensor values and corresponding height of the gripper is depicted in FIG. 9.

Figure 9:
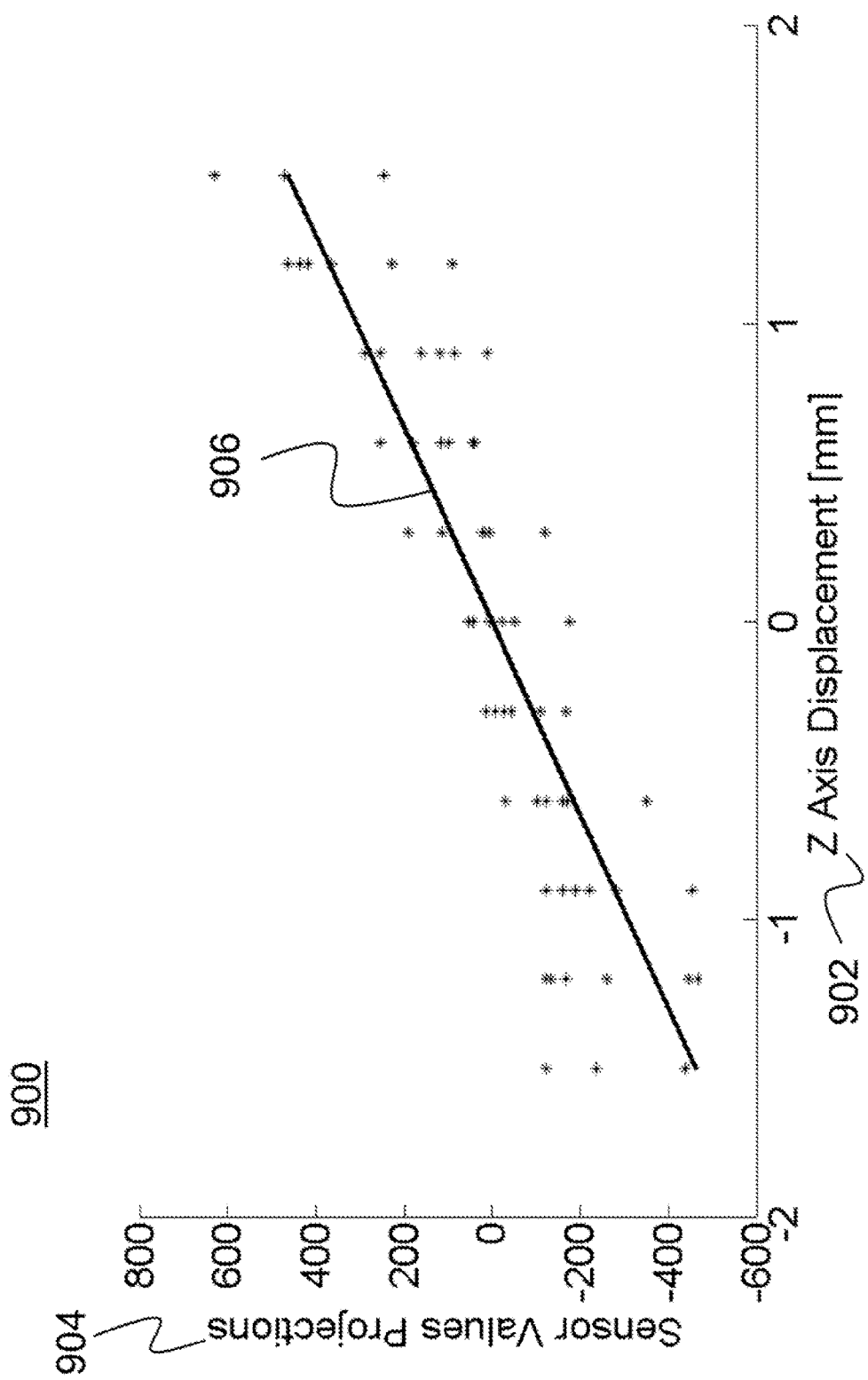
FIG. 9 is a graph illustrating a relationship between robotic gripper location and low-dimensional representation of tactile input; and Appendix A is a paper by the inventors of the present application in which they further describe how the online learning of tactile feedback allows adaptation to unknown hand-tool and tool-environment interfaces. The Appendix is hereby incorporated, in its entirety, by reference as though incorporated herein and is to be considered an integral part of this specification.

FIG. 9 is a graph 900 illustrating the relationship between robotic gripper location (Z-axis displacement 902) and low-dimensional representation of tactile input (sensor value projections 904). Recorded values from one exploration trial are shown together with a linear fit to the data (solid line 906).

To learn this relationship and without implying a limitation, linear regression (ordinary least squares) was used between the gripper height and sensor representation (sensory input projected onto first principal component). The desired sensor representation was set to the mean of observed values during exploration. During drawing, the robot gripper moved uniformly in the horizontal direction, with the height of the gripper being controlled. The robot could draw on a surface with unknown slope based on tactile feedback despite uncertainty of the pencil-sensor interface (the average deviation of the pen tip from the slope was 0.8 millimeters (mm)). The pencil drawing was tested for several trials varying the orientation of the pencil in the gripper and the slope of the drawing surface. The results were consistent across trials, including trials in which the slope changed direction.

(4) Synopsis

The present invention is directed to a system and method for robotic tool manipulation. This system enables a robot through online exploration to adjust the tool's position given tactile sensory input. In operation, the system learns a low-dimensional representation of the sensory input (i.e., tactile sensory data) and learns the mapping from this representation to control-relevant position commands (i.e., control commands) for the robotic gripper.

Using this method, it was demonstrated that the robot could accurately draw (0.8 mm position error) with a pencil on a paper of unknown and varying slope. Through online learning, the robot could automatically adapt to the tool (e.g., pencil) position inside the gripper.

In addition, the system can be extended to different kinds of motor commands and sensory values so that it can be used with more tasks involving hand-held tools. The general process is also open to non-linear mappings. This capability and the demonstrated flexibility allows for autonomous tool use where a robot grasps a tool and, thus, cannot accurately pre-compute the tool's position within the robot gripper.

What is claimed is:

1. A robotic control device for manipulating a hand held tool, comprising:
   a gripper, the gripper being mobile in at least one degree of freedom;
   a plurality of tactile sensors attached with the gripper, each sensor operable for generating tactile sensory data upon grasping a tool based on the interface between the tool and the corresponding tactile sensor,
   a computer communicatively connected with both the gripper and the tactile sensors, the computer having a memory and a data processor, the memory encoded with instructions, that when executed, cause the data processor to perform operations of:
      causing the gripper to grasp the tool and move the tool into contact with a surface;
      via a control command, causing the gripper to perform a movement with the tool against the surface to generate tactile sensory data;
      performing a dimensionality reduction of the tactile sensory data to generate a low-dimensional representation of the tactile sensory data;
      learning a relationship between the low-dimensional representation of the tactile sensory data and the control command to generate a sensory-motor mapping, by performing operations of:
         collecting data points that include corresponding pairs of sensory input signal data and control commands to form a joint sensory-motor space;
         identifying a lower dimensional manifold embedded in the joint sensory-motor space that represents the data points;
         identifying points on the lower dimensional manifold that have a sensory component that matches a given sensory input signal;
         projecting the identified points onto a motor subspace to identify control commands as reflected in the sensory motor mapping; and
      generating a series of control commands in a closed-loop based on the sensory-motor mapping to manipulate the tool against the surface.

2. The robotic control device as set forth in claim 1, wherein the gripper is a robotic hand.

3. The robotic control device as set forth in claim 2, further comprising an image sensor for capturing an image of the tool, and wherein the computer is further configured to cause the processor to perform operations of:
   capturing an image of the tool;
   identifying a desired point on the tool for moving into contact with the surface; and
   generating a series of control commands in a closed-loop to cause the gripper to manipulate the tool until the desired point is moved into contact with the surface.

4. The robotic control device as set forth in claim 3, wherein the sensory data includes a magnitude of a force input.

5. The robotic control device as set forth in claim 3, wherein the sensory data includes both a magnitude and direction of a force input.

6. The system as set forth in claim 3, wherein in identifying a desired point on the tool for moving into contact with the surface, the system includes a tool recognition/feature extraction module that identifies the tool and extracts features of the tool to identify the desired point of the tool.

7. The system as set forth in claim 6, wherein the desired point of the tool is the tool tip.

8. The robotic control device as set forth in claim 1, further comprising an image sensor for capturing an image of the tool, and wherein the computer is further configured to cause the processor to perform operations of:
   capturing an image of the tool;
   identifying a desired point on the tool for moving into contact with the surface; and
   generating a series of control commands in a closed-loop to cause the gripper to manipulate the tool until the desired point is moved into contact with the surface.

9. The robotic control device as set forth in claim 1, wherein the sensory data includes a magnitude of a force input.

10. The robotic control device as set forth in claim 1, wherein the sensory data includes both a magnitude and direction of a force input.

11. The system as set forth in claim 1, wherein in causing the gripper to perform a movement with the tool against the surface to generate tactile sensory data, the movement includes movements selected from a group consisting of random movements, zig-zag movements, rectangular oscillation, periodic movements, and pseudo-random movements.

12. A computer program product for manipulating a hand held tool, the computer program product comprising computer-readable instructions stored on a non-transitory computer-readable medium that are executable by a computer having a processor for causing the processor to perform operations of:
   causing a gripper, having tactile sensors, to grasp a tool and move the tool into contact with a surface;
   via a control command, causing the gripper to perform a movement with the tool against the surface to generate tactile sensory data from the tactile sensors;

performing a dimensionality reduction of the tactile sensory data to generate a low-dimensional representation of the tactile sensory data;

learning a relationship between the low-dimensional representation of the tactile sensory data and the control command to generate a sensory-motor mapping, by performing operations of:

collecting data points that include corresponding pairs of sensory input signal data and control commands to form a joint sensory-motor space;

identifying a lower dimensional manifold embedded in the joint sensory-motor space that represents the data points;

identifying points on the lower dimensional manifold that have a sensory component that matches a given sensory input signal;

projecting the identified points onto a motor sub-space to identify control commands as reflected in the sensory motor mapping; and generating a series of control commands in a closed-loop based on the sensory-motor mapping to manipulate the tool against the surface.

13. The computer program product as set forth in claim 12, further comprising instructions for causing the processor to perform operations of:

capturing an image of the tool using an image sensor;

identifying a desired point on the tool for moving into contact with the surface; and generating a series of control commands in a closed-loop to cause the gripper to manipulate the tool until the desired point is moved into contact with the surface.

14. The computer program product as set forth in claim 13, wherein in causing the gripper to perform a movement with the tool against the surface to generate tactile sensory data from the tactile sensors, the sensory data includes a magnitude of a force input.

15. The computer program product as set forth in claim 12, wherein in causing the gripper to perform a movement with the tool against the surface to generate tactile sensory data from the tactile sensors, the sensory data includes a magnitude of a force input.

16. A computer implemented method for manipulating a hand held tool, the method comprising an act of causing a computer having a processor and non-transitory machine readable memory to execute instructions specifically encoded in the memory, such that upon execution, the processor performs operations of:

causing a gripper, having tactile sensors, to grasp a tool and move the tool into contact with a surface;

via a control command, causing the gripper to perform a movement with the tool against the surface to generate tactile sensory data from the tactile sensors;

performing a dimensionality reduction of the tactile sensory data to generate a low-dimensional representation of the tactile sensory data;

learning a relationship between the low-dimensional representation of the tactile sensory data and the control command to generate a sensory-motor mapping, by performing operations of:

collecting data points that include corresponding pairs of sensory input signal data and control commands to form a joint sensory-motor space;

identifying a lower dimensional manifold embedded in the joint sensory-motor space that represents the data points;

identifying points on the lower dimensional manifold that have a sensory component that matches a given sensory input signal;

projecting the identified points onto a motor sub-space to identify control commands as reflected in the sensory motor mapping; and generating a series of control commands in a closed-loop based on the sensory-motor mapping to manipulate the tool against the surface.

17. The method as set forth in claim 16, further comprising an act of causing the processor to perform operations of:

capturing an image of the tool using an image sensor;

identifying a desired point on the tool for moving into contact with the surface; and generating a series of control commands in a closed-loop to cause the gripper to manipulate the tool until the desired point is moved into contact with the surface.

18. The method as set forth in claim 17, wherein in causing the gripper to perform a movement with the tool against the surface to generate tactile sensory data from the tactile sensors, the sensory data includes a magnitude of a force input.

19. The method as set forth in claim 16, wherein in causing the gripper to perform a movement with the tool against the surface to generate tactile sensory data from the tactile sensors, the sensory data includes both a magnitude and direction of a force input.

* * * * *